United States Patent [19]

Moriya et al.

[11] Patent Number: 4,566,576
[45] Date of Patent: Jan. 28, 1986

[54] REDUCTION GEAR HAVING A MAGNET CLUTCH MECHANISM

[75] Inventors: Masaichi Moriya, Chigasaki; Haruo Mochida; Yoshimitsu Takeda, both of Yokohama, all of Japan

[73] Assignees: Ohi Seisakusho Co., Ltd.; Nissan Motor Co., Ltd., both of Yokohama, Japan

[21] Appl. No.: 435,691

[22] Filed: Oct. 21, 1982

[30] Foreign Application Priority Data

Oct. 23, 1981 [JP] Japan .................. 56-169717

[51] Int. Cl.⁴ .................. F16D 27/10; F05F 15/12
[52] U.S. Cl. .................. 192/84 C; 49/139; 49/359; 74/625
[58] Field of Search .................. 74/625; 192/84 C; 49/139, 358, 359

[56] References Cited

U.S. PATENT DOCUMENTS

| | | | |
|---|---|---|---|
| 2,621,926 | 12/1952 | Rossmann et al. .................. | 74/625 |
| 3,055,475 | 9/1962 | Pitts, Jr. .................. | 192/84 C |
| 3,069,151 | 12/1962 | Cook et al. .................. | 49/139 X |
| 3,344,554 | 10/1967 | Misaka et al. .................. | 49/139 X |
| 3,446,322 | 5/1969 | Wrencsh .................. | 192/84 C X |
| 3,455,421 | 7/1969 | Miller .................. | 192/84 C |
| 3,791,071 | 2/1974 | Niklaus .................. | 74/625 X |
| 4,170,278 | 10/1979 | Schubert .................. | 188/161 |
| 4,285,421 | 8/1981 | Halsted .................. | 192/84 C |
| 4,353,446 | 10/1982 | Wilken et al. .................. | 192/84 C X |
| 4,425,520 | 1/1984 | Hiraga .................. | 192/84 C X |

FOREIGN PATENT DOCUMENTS

| | | | |
|---|---|---|---|
| 2743982 | 4/1979 | Fed. Rep. of Germany | 49/139 |
| 2804884 | 8/1979 | Fed. Rep. of Germany | 192/84 C |

*Primary Examiner*—Rodney H. Bonck
*Attorney, Agent, or Firm*—Poms, Smith, Lande & Rose

[57] ABSTRACT

A reduction gear mechanism comprising a worm and a worm wheel which mechanism includes a magnet clutch wherein a coil is disposed in one side of the worm wheel which serves as a rotor, while an armature is disposed in the other side of the same. Upon energization of the coil, the mechanism acts as a normal reduction gear whereas, upon deenergization, an output power shaft of the clutch can be rotated freely or independently. Since the incorporation of the magnet clutch results in no substantial increase of the size of the reduction gear mechanism, the mechanism can be advantageously installed where a space for installation is restricted, such as a door of an automobile.

4 Claims, 5 Drawing Figures

REDUCTION GEAR HAVING A MAGNET CLUTCH MECHANISM

BACKGROUND OF THE INVENTION

This invention relates to a reduction gear mechanism having a magnet clutch mechanism therein and comprising a worm and a worm wheel.

Conventionally, automobiles and the like vehicles commonly employ an electric motor as a source of a driving force to automatically operate various devices and apparatus provided therein.

In such conventional automobiles, a final reduction gear comprising a worm and a worm wheel in combination is used to multiply output torque of the motor. A clutch is interposed between the motor and the final reduction gear which is operable to connect and disconnect transmission of power between them.

FIG. 1 illustrates an example of such a construction, which comprises a motor (a), a clutch (b), a final reduction gear (c) comprising a worm and a worm wheel in combination, and an output power shaft (d).

This construction, however, is disadvantageous in that it requires a large spacing for installation.

Besides, the combination of a worm and a worm wheel has a deficiency that it does not allow a reverse operation thereof from its output side. Accordingly, even if the clutch is disengaged to stop an automatic operation, it does not result in availability of a manual operation from the output side.

If the construction is modified to increase the lead angle of the worm to reduce the reduction ratio of the reduction gear mechanism, it will enable a reversing operation of the reduction gear mechanims from its output side. But, such modification will not lead to a smooth reversing operation of the reduction gear mechanism since such a reversing operation will be opposed by a load arising at the reduction stage. Also, such modification will result in an employment of a larger motor to meet the requirement of larger torque.

SUMMARY OF THE INVENTION

Accordingly, it is an object of the present invention to provide a reduction gear mechanism wherein a clutch mechanism is included in a final reduction gear to facilitate installation of the reduction gear mechanism within a restricted spacing.

It is another object of the invention to provide a reduction gear mechanism which allows a rotational operation, and especially a manual rotational operation, of the same from its output side.

According to the present invention, there is provided a reduction gear mechanism having a magnet clutch mechanism, comprising a casing, an output power shaft supported for rotation on said casing, an armature mounted on said output power shaft within said casing, a coil fixed to said casing in an opposing relationship to said armature, a worm wheel interposed between said coil and said armature and mounted for rotation on said casing, said armature being normally in a spaced relationship from said worm wheel, and a worm mounted for rotation on said casing in a meshed relationship with said worm wheel, whereby, upon energization of said coil, said armature is magnetically attracted to said worm wheel thereby to connect transmission of rotation of said worm to said output power shaft.

Further features, objects and advantages will be apparent from the following detailed description of a preferred embodiment of the present invention, taken in conjunction with the accompanying drawing, in which:

DETAILED DESCRIPTION OF THE PREFERRED EMBODIMENT

Figure 1:
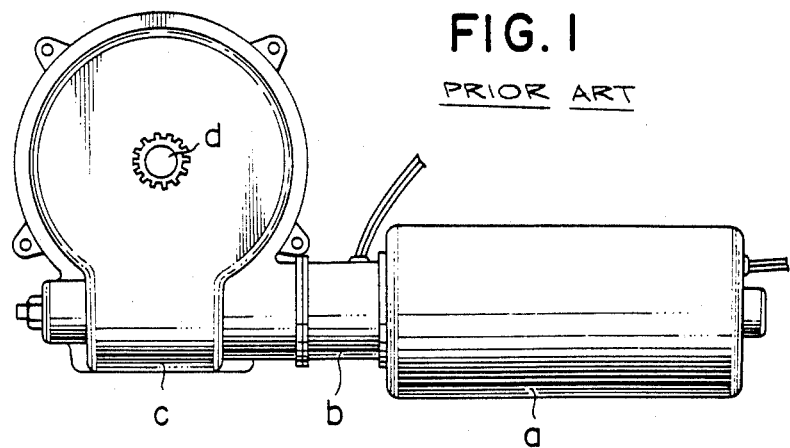
FIG. 1 is a front elevational view showing a conventional reduction gear mechanism.
Figure 3:
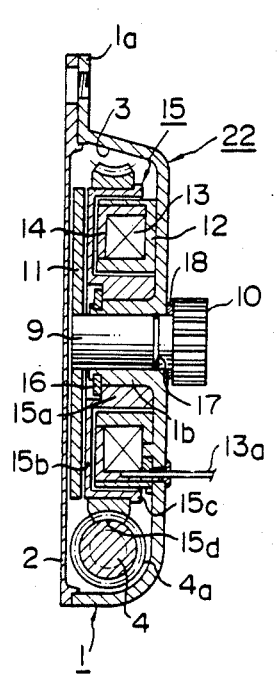
FIG. 3 is a central longitudinal sectional view taken along line III—III of FIG. 2.
Figure 2:
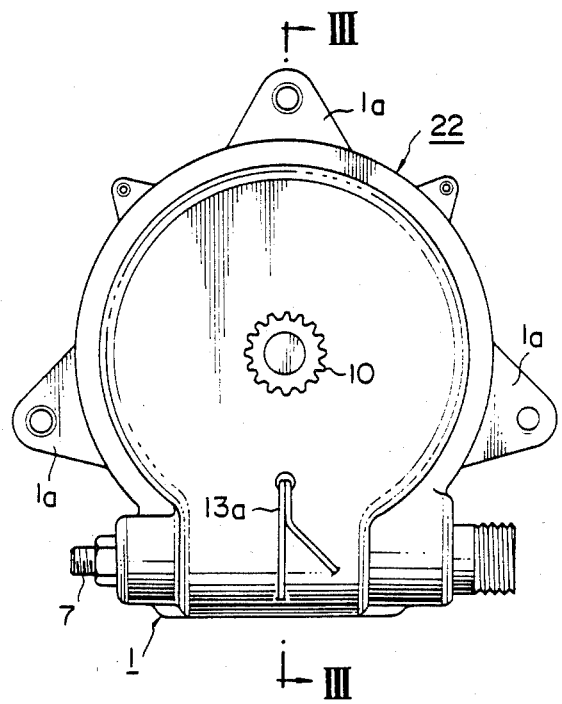
FIG. 2 is a front elevational view showing an embodiment of the present invention.
Figure 4:
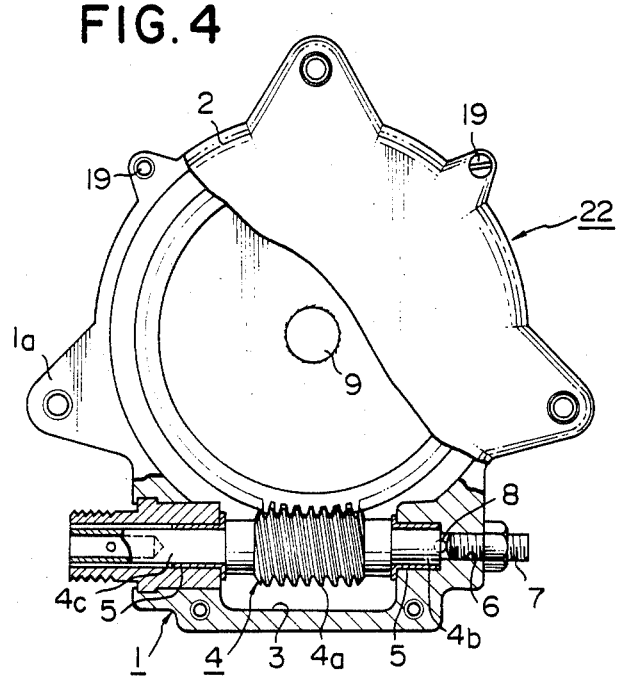
FIG. 4 is a rear elevational view, partly broken, of the mechanism of FIG. 2.

Referring first to FIGS. 2-4, there is illustrated a reduction gear mechanism embodying the present invention. The reduction gear mechanism comprises a casing 1 in the form of a box which is open at the rear thereof. The rear opening of the casing 1 is covered and closed up by a rear lid 2 to define a room 3 within the casing 1. A plurality of flanges 1a are formed around a periphery of the casing 1 to enable mounting of the casing 1.

A shaft 4 extending in parallel with the rear lid 2 is rotatably and horizontally arranged in a lower part of the room 3 of the casing 1 and is supported at opposite end portions 4b and 4c thereof on the casing 1 via respective bushes 5. The shaft 4 has a worm 4a in its intermediate portion.

As shown in FIG. 4, the shaft 4 may be connected at a left-hand side end portion 4c thereof to a motor or the like by way of a connecting rod (not shown).

Adjacent to a right-hand side end portion 4b of the shaft 4, the casing 1 has a threaded hole 6 formed therein in an opposing relationship to the end face of the shaft 4. A thread screw 7 is screwed in the threaded hole 6 such that an end face of the thread screw 7 presses a steel ball 8 against the center of the end face of the shaft 4.

As shown in FIG. 3, the casing 1 has a post-like bearing portion 1b formed to extend therefrom into the room 3. An output power shaft 9 extends through and is mounted on the bearing portion 1b of the casing 1 for rotation and for axial motion by a limited distance.

A pinion 10 is fitted on a forward end of the output shaft 9 which is projected outside the casing 1. On the other hand, to a rear end of the output power shaft 9 is fixed an armature 11 in the form of a disk made of ferromagnetic soft iron and constituting a magnet clutch.

An annular yoke 12 is provided which is made of a magnetic material and presents a channel-like cross section which is open to the rear side of the casing 1.

The yoke 12 is fixed to an inner surface of the casing 1 such that an inner circumferential surface of the yoke 12 is spaced from an outer periphery of the bearing portion 1b of the casing 1 with a predetermined gap being left therebetween.

An annular coil 13 is inserted in the yoke 12 through the opening on the rear side. A lead wire 13a of the coil 13 extends through the yoke 12 and the casing 1 and is drawn out to the front side of the casing 1.

A non-magnetic member 14 made of a synthetic resin material is mounted to cover the rear open end of the yoke 12 to secure the coil 13 within the yoke 12.

A worm wheel 15 is provided which serves also as a rotor of the magnet clutch. In particular, the worm wheel 15 is made of ferromagnetic soft iron and comprises a cylindrical hub portion 15a, an end wall 15b extending from a rear side end of the hub portion 15a, a ring portion 15c extending forwardly from an outer circumferential edge of the end wall 15b, and an annular toothed member 15d made of a suitable synthetic resin material and integrally fitted on an outer periphery of the ring portion 15c.

The hub portion 15a of the worm wheel 15 is fitted for rotation around the bearing portion 1b of the casing 1 and has its outer peripheral surface opposed to an inner peripheral surface of the yoke 12 with a slight gap being left therebetween.

A front end face of the end wall 15b of the worm wheel 15 is opposed to the non-magnetic member 14 of the yoke 12 with a slight gap being left therebetween while a rear end face of the end wall 15b is opposed to a front end face of the armature 11 also with a slight gap being left therebetween.

Further, an inner peripheral surface of the ring portion 15c of the worm wheel 15 is opposed to an outer peripheral surface of the yoke 12 with a slight gap being left therebetween. The toothed member 15d of the worm wheel 15 is always in a meshing engagement with the worm 4a, as apparently seen in FIG. 4.

Accordingly, the worm wheel 15 can be freely rotated around the bearing portion 1b of the casing 1, apart from the armature 11, the yoke 12, the coil 13 and the nonmagnetic member 14 when the coil 13 is not actuated, while the yoke 12, the coil 13 and the non-magnetic member 14 are fitted in the annular hollow defined by the hub portion 15a, the end wall 15b and the ring portion 15c of the worm wheel 15 with a slight gap therebetween.

In this case, when the number of the teeth of the toothed member 15d with reference to the worm 4a is increased, the rotation of the worm 4a can be transmitted at a further reduced speed.

A snap ring 16 is fitted in a groove formed in the rear end portion of the bearing portion 1b of the casing 1, and prevents the worm wheel 15 from coming out rearwards. An 0-ring 17 is fitted in a groove formed on and around the outer periphery of the output power shaft 9 in its front end portion. A washer 18 is fitted on the output power shaft 9 adjacent to the rear end of the pinion 10, and prevents the output power shaft 9 from further moving rearwards. A plurality of screws 19 are used for mounting the rear lid 2 to the casing 1.

The operation of the reduction gear mechanism having the construction described above will now be described in detail by referring mainly to FIG. 3.

When the coil 13 is energized, a magnetic field is produced and acts upon the end wall 15b of the worm wheel 15. The worm wheel end wall 15b then serves as a magnet and attracts the armature 11 which is integral with the output shaft 9 to move in the forward direction.

As a result, the rotation of the worm 4a is transmitted to the worm wheel 15 by way of the toothed member 15d meshed with the worm 4a and further to the output power shaft 9 through a frictional engagement of the end wall 15b of the worm wheel 15 with the armature 11, resulting in rotation of the output power shaft 9.

On the other hand, when energization of the coil 13 is stopped, the attracting force between the armature 11 and the worm wheel end wall 15b disappears and hence the output shaft 9 is disconnected from the worm wheel 15. Accordingly, even when a force is applied to the output power shaft 9 in the reverse way from the pinion 10, it is not transmitted to the worm wheel 15 so that the output power shaft 9 may be able to be rotated freely.

In this way, the worm wheel 15, on one hand, cooperates with the worm 4a to provide a speed reducing function, and on the other hand, acts as a rotor of the magnet clutch with reference to the armature 11.

It may be noted that, while in the embodiment an axial play of the output power shaft 9 relative to the bearing portion 1b accommodates a separating motion of the armature 11 from the worm wheel 15, the gap between the armature 11 and the end wall 15b of the worm wheel 15 may otherwise be widened sufficiently such that a spring (not shown) may be suitably disposed therein which urges the armature 11 in a direction away from the worm wheel 15.

Figure 5:
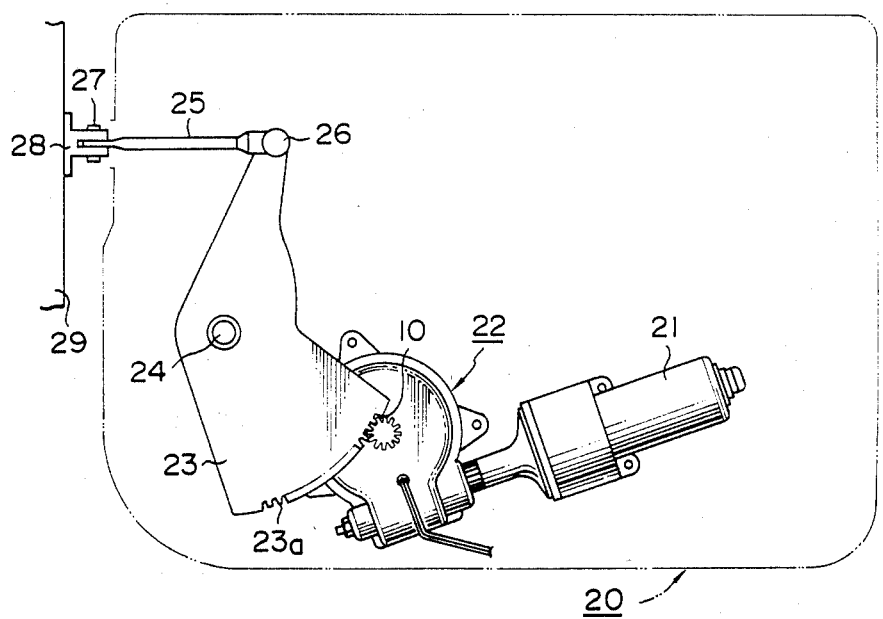
FIG. 5 is a front elevational view of the embodiment of the invention as applied to an automatic door opening and closing apparatus.

Referring now to FIG. 5, there is illustrated an exemplary application of the mechanism according to the present invention to an automatic door opening and closing apparatus of an automobile, which is one of applications which can present the maximum effect of the invention the spirit of which resides in simultaneous employment of a magnet clutch and a reduction gear in a reduction gear mechanism.

The automobile has a rear door 20 mounted for opening and closing motion on a car body (not shown) by means of a door hinge (not shown).

The door 20 has a motor 21 fixedly mounted thereon to which a reduction gear mechanism 22 including a clutch mechanism according to the present invention is directly connected.

A sector gear 23 is supported at a central portion thereof for pivotal motion on the door 20 by means of a pivot 24. The sector gear 23 has a toothed edge 23a which is meshed with the pinion 10 of the reduction gear 22.

A push rod 25 is pivotally connected at a rear end thereof to an upper end of the sector gear 23 by means of a pin 26 and is pivotally connected at a front end thereof to a bracket 28 by means of a pivot 27.

The bracket 28 is fixedly mounted on a center pillar 29 located at the center of the car body of the automobile.

If it is intended to automatically open or close the door 20, a switch (not shown in the drawings) is turned on to bring the clutch mechanism included in the reduction gear mechanism into engagement to allow the motor 21 to rotate in the forward or reverse direction.

Thus, the sector gear 23 is pivoted in the clockwise or counterclockwise direction as viewed in FIG. 5 through the pinion 10 of the reduction gear mechanism 22, and thereupon the push rod 25 is pushed or pulled in an axial direction thereof to open or close the door 20.

On the other hand, if the door 20 is opened or closed by a manual operation thereof, the sector gear 23 is pivoted now in the opposite direction through the push rod 25 so that a force is applied to the pinion 10.

The reduction gear mechanism 22 according to the present invention, however, includes a clutch mechanism therein which allows disconnection of transmission of such a force so that the output power shaft can be rotated independently. Accordingly, manual opening and closing operations of the door can be easily carried out without being confronted by a resisting force of the motor, the reduction gear mechanism, and so on.

As apparent from the foregoing description, according to the present invention, a reduction gear mechanism comprising a worm and a worm wheel includes a magnet clutch, wherein a coil is disposed in one side of the worm wheel which serves as a rotor, while an armature is disposed in the other side of the same.

Thus, if a motor is energized, the reduction gear mechanism acts as a normal reduction gear. On the other hand, if the motor is deenergized, the output shaft can be rotated freely.

Accordingly, if a reduction gear mechanism according to the present invention is incorporated in an automatic door opening and closing apparatus of an automobile, the door can be advantageously opened or closed by a manual operation thereof. Thus, a reduction gear mechanism according to the present invention can be incorporated also in any other device or apparatus which requires automatic operations as well as manual operations thereof. Thus, it is apparent that a reduction gear mechanism according to the present invention has a great number of applications thereof.

Also, a reduction gear mechanism according to the present invention includes a magnet clutch mechanism incorporated therein although it has a similar overall size to that of a conventional reduction gear. Consequently, it can be installed where a space is restricted, for example, in a door of an automobile and so on.

Further, since the magnet clutch is of the type utilizing friction, it only produces very small attracting noises upon engagement and disengagement thereof. Also, an electric current for energizing a coil can be reduced sufficiently weak, and hence it is apparently economical.

Although the present invention has been described in some detail by way of illustration and example for purposes of clarity of understanding, it will, of course, be understood that various changes and modifications may be made in the forms, details, and arrangements of the parts without departing from the scope of the present invention.

What is claimed is:

1. A reduction gear mechanism having a magnet clutch mechanism, comprising:
   (a) a casing having a front side and a rear side;
   (b) an output power shaft supported for rotation on said casing;
   (c) an armature mounted to said output power shaft within said casing adjacent said casing rear side;
   (d) an annular yoke made of magnetic material having a front side fixed to said casing front side and upper and lower sides extending rearward therefrom towards said casing rear side and defining an opening on the rear side of said yoke;
   (e) an annular coil housed within said annular yoke in an opposing relationship to said armature;
   (f) a non-magnetic annular member extending between the upper and lower sides of said annular yoke at the rear side of said yoke adjacent to said coil;
   (g) a worm wheel which is interposed between said yoke and said armature and is rotatably mounted to said casing, so as to be rotated freely apart from said coil and said armature when the coil is not energized, said worm wheel comprising a cylindrical hub portion, an end wall extending from a rear side end of the hub portion and being interposed between said coil and said armature, a ring portion extending forwardly from an outer circumferential edge of said end wall and an annular toothed member integrally fitted on an outer periphery of the ring portion, wherein said hub portion, end wall and ring portion of said worm wheel define an annular hollow in which said annular yoke is matingly housed; and
   (h) a worm which is rotatably mounted to said casing in a meshed relationship with the annular toothed member of said worm wheel, whereby, upon energization of said coil, said armature is magnetically attracted to said worm wheel thereby to connect transmission of rotation of said worm to said armature and said output power shaft.

2. A reduction gear mechanism as defined in claim 1, wherein said hollow and said yoke are positioned so that there is a slight gap between the wheel hub portion, end wall and ring portion of said worm wheel and said yoke to provide said free rotation between said worm wheel and said yoke.

3. A reduction gear mechanism according to claim 1 wherein said non-metallic member is made of synthetic resin material.

4. A reduction gear mechanism according to claim 1 wherein non-magnetic member includes a portion extending forward and between said worm wheel ring portion and said coil to position said non-magnetic member at said yoke rear opening.

* * * * *